United States Patent
Nakano

(10) Patent No.: US 8,836,279 B2
(45) Date of Patent: Sep. 16, 2014

(54) POWER SUPPLY APPARATUS, METHOD FOR CONTROLLING THE POWER SUPPLY APPARATUS, AND COMPUTER-READABLE STORAGE MEDIUM

(75) Inventor: Katsuya Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 13/050,166

(22) Filed: Mar. 17, 2011

(65) Prior Publication Data

US 2011/0244794 A1 Oct. 6, 2011

(30) Foreign Application Priority Data

Mar. 30, 2010 (JP) ................................. 2010-079442

(51) Int. Cl.
*H02J 7/00* (2006.01)
*H02J 7/02* (2006.01)
(52) U.S. Cl.
CPC ............... *H02J 7/025* (2013.01); *H02J 7/0027* (2013.01)
USPC ......................................... 320/108; 700/296
(58) Field of Classification Search
USPC .......................................................... 320/108
See application file for complete search history.

(56) References Cited

U.S. PATENT DOCUMENTS

| 2005/0189910 A1* | 9/2005 | Hui ................................. 320/108 |
| 2007/0139000 A1 | 6/2007 | Kozuma et al. |
| 2009/0271048 A1* | 10/2009 | Wakamatsu .................. 700/296 |

FOREIGN PATENT DOCUMENTS

| JP | 11-98706 | 4/1999 |
| WO | 2009-105595 A2 | 8/2009 |

OTHER PUBLICATIONS

Chinese Office Action dated Mar. 28, 2013 in Chinese Appln. No. 2011-10079705.3, with English Translation.

* cited by examiner

*Primary Examiner* — Samuel Berhanu
(74) *Attorney, Agent, or Firm* — Fitzpatrick, Cella, Harper & Scinto

(57) ABSTRACT

If a plurality of power receiving apparatuses are in a predetermined range, a power supply apparatus selects a power receiving apparatus to be preferentially charged based on the remaining capacities of batteries of the respective power receiving apparatuses, and stops charging of the power receiving apparatuses other than the selected power receiving apparatus until the remaining capacity of the selected power receiving apparatus reaches a predetermined value.

9 Claims, 8 Drawing Sheets

F I G. 3A

| IDENTIFICATION INFORMATION | REMAINING CAPACITY RATE | OPERABLE TIME PERIOD | TIME PERIOD REQUIRED UNTIL FULL CHARGE |
|---|---|---|---|
| 1 | 90% | 20H | 15 MIN |
| 2 | 85% | 23H | 20 MIN |

F I G. 3B

| GROUP NUMBER | NUMBER OF POWER RECEIVING APPARATUSES IN GROUP |
|---|---|
| 1 | 2 |
| 2 | 1 |
| 3 | |

POWER SUPPLY APPARATUS, METHOD FOR CONTROLLING THE POWER SUPPLY APPARATUS, AND COMPUTER-READABLE STORAGE MEDIUM

BACKGROUND OF THE INVENTION

1. Field of the Invention

The present invention relates to a power supply apparatus, method for controlling the power supply apparatus, and computer-readable storage medium.

2. Description of the Related Art

In recent years, a non-contact charging system in which a power supply apparatus supplies electric power to a power receiving apparatus such as a mobile phone or digital still camera, to which a secondary battery is attached, without any connection via connectors, so as to charge its secondary battery, is known. For example, as disclosed in Japanese Patent Laid-Open No. 11-98706, it is known that such non-contact charging system charges the secondary battery attached to the power receiving apparatus by an induced electromotive force, which is generated on a secondary coil included in the power receiving apparatus due to a magnetic flux change generated by the power supply apparatus including a primary coil.

In such non-contact charging system, when a plurality of power receiving apparatuses exist within a power supply range, the power supply apparatus supplies at the same time electric power to the plurality of power receiving apparatuses. However, secondary batteries attached to this plurality of power receiving apparatuses have various remaining capacities as remaining power amounts depending on their operable time periods. For example, even when the power supply apparatus supplies at the same time electric power to two power receiving apparatus, a secondary battery to be charged in one power receiving apparatus and that to be charged in the other power receiving apparatus suffer remaining capacity variations. For this reason, even when the power supply apparatus supplies at the same time electric power to the plurality of power receiving apparatuses, these power receiving apparatuses include both an apparatus having a large remaining capacity and that having a small remaining capacity.

That is, even when the power supply apparatus supplies at the same time electric power to the plurality of power receiving apparatuses, since the secondary batteries attached to these power receiving apparatuses suffer remaining capacity variations, the operable time periods of the plurality of power receiving apparatuses cannot be made equal to each other.

SUMMARY OF THE INVENTION

The present invention has been made in consideration of the problems of the related art. The present invention provides a technique for supplying electric power to a plurality of power receiving apparatuses so as to eliminate remaining capacity variations of secondary batteries of the power receiving apparatuses.

The present invention in its first aspect provides a power supply apparatus for supplying electric power to a plurality of power receiving apparatuses in a non-contact manner, the power supply apparatus comprising: a detection unit configured to detect that at least one of a first power receiving apparatus and a second power receiving apparatus is in a predetermined range; a division unit configured to divide, if it is detected that the second power receiving apparatus is in the predetermined range before elapsing a predetermined time period since it is detected that the first power receiving apparatus is in the predetermined range, the first power receiving apparatus and the second power receiving apparatus into a first group; an acquisition unit configured to acquire first information indicating a remaining capacity of a first battery charged by the first power receiving apparatus from the first power receiving apparatus, and to acquire second information indicating a remaining capacity of a second battery charged by the second power receiving apparatus from the second power receiving apparatus; and a communication unit configured to transmit, if the first group is selected and the remaining capacity of the first battery is smaller than the remaining capacity of the second battery, a first command to the first power receiving apparatus, and to transmit a second command to the second power receiving apparatus, wherein the first command includes a command used for instructing to execute charging, and the second command includes a command used for instructing to stop charging.

Further features of the present invention will become apparent from the following description of exemplary embodiments (with reference to the attached drawings).

BRIEF DESCRIPTION OF THE DRAWINGS

FIG. 3A illustrates an example of a device table according to the first embodiment;

FIG. 3B illustrates an example of a group table according to the first embodiment;

DESCRIPTION OF THE EMBODIMENTS

Figure 1:
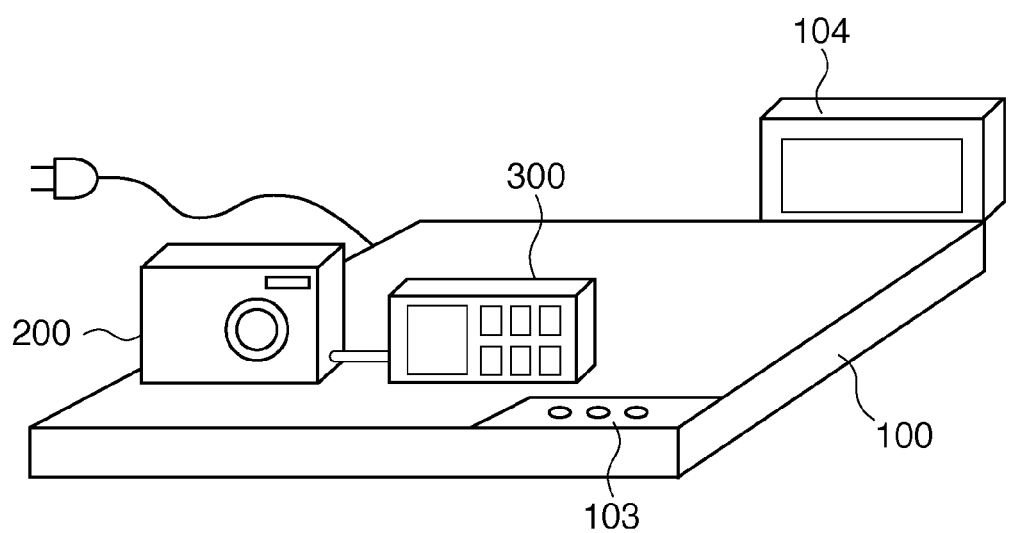
FIG. 1 is illustrates an example of a power supply system according to the first embodiment.

The first embodiment of the present invention will be described in detail hereinafter with reference to the drawings. A power supply system according to the first embodiment includes a power supply apparatus 100 and power receiving apparatuses 200 and 300.

The power receiving apparatus 200 can attach a detachable secondary battery (not shown). The power receiving apparatuses 200 is an electronic apparatus which operates based on electric power supplied from the attached secondary battery, and charges the attached secondary battery by electric power supplied from the power supply apparatus 100. Likewise, the power receiving apparatus 300 is an electronic apparatus which operates based on electric power supplied from an attached secondary battery (not shown), and charges the attached secondary battery based on electric power supplied from the power supply apparatus 100. The power receiving apparatuses 200 and 300 receive electric power which are required to charge their secondary batteries and are supplied from the power supply apparatus 100.

Note that the power supply apparatus 100 according to the first embodiment has a primary coil, and generates a magnetic flux pattern on the primary coil. Also, each of the power receiving apparatuses 200 and 300 according to the first embodiment has a secondary coil, and an induced electromotive force is generated on the secondary coil due to a change in magnetic flux pattern generated by the power supply apparatus 100.

Note that the following description will be given while exemplifying a power supply station 100 as the power supply apparatus 100 (the power supply apparatus 100 will be referred to as "power supply station 100" hereinafter), exemplifying a digital still camera 200 as the power receiving apparatus 200 (the digital still camera 200 will be referred to as "camera 200" hereinafter), and exemplifying a mobile phone 300 as the power receiving apparatus 300. Note that the power supply system according to the first embodiment may be other than the system in which the power supply station 100 charges the power receiving apparatuses 200 and 300 using an induced electromotive force generated by electromagnetic induction. The power supply system according to the first embodiment may be, for example, a system in which the power supply station 100 charges the power receiving apparatuses 200 and 300 using an electromotive force generated by magnetic field resonance, as long as a power supply apparatus supplies electric power to power receiving apparatuses in a non-contact manner.

Note that when the power supply station 100 supplies electric power to the power receiving apparatus 200 by magnetic field resonance in a non-contact manner in the power supply system, the power supply station 100 has an AC power supply, driven element, and resonance element, and the power receiving apparatus 200 has a rectification circuit, driven element, and resonance element. Each of the driven elements and resonance elements of the power supply station 100 and power receiving apparatus 200 is configured by an air core coil, and the driven elements and resonance elements of the respective apparatuses are coupled by electromagnetic induction. The power supply station 100 controls the AC power supply so that a frequency of a magnetic field generated from the resonance element of the power supply station 100 matches a resonance frequency of the resonance element of the power receiving apparatus 200. In this case, when the frequency of the magnetic field generated from the resonance element of the power supply station 100 matches the resonance frequency of the resonance element of the power receiving apparatus 200, the resonance elements of the power supply station 100 and power receiving apparatus 200 have a magnetic field resonance relationship. When the frequency of the magnetic field generated from the resonance element of the power supply station 100 matches the resonance frequency of the resonance element of the power receiving apparatus 200, an AC current is supplied from the resonance element of the power supply station 100 to that of the power receiving apparatus 200 in a non-contact manner.

In this case, the AC current supplied from the resonance element of the power supply station 100 generates electromagnetic induction on the resonance element of the power receiving apparatus 200. Furthermore, the resonance element of the power receiving apparatus 200 supplies an AC current to its driven element, and is converted into a DC current by the rectification circuit, thereby supplying electric power from the power supply station 100 to the power receiving apparatus 200 by magnetic field resonance in a non-contact manner.

Note that the power receiving apparatuses 200 and 300 are not limited to a digital still camera and mobile phone, and they may be electronic apparatuses such as a video camera and music player as long as they operate based on electric power supplied from a secondary battery.

When the camera 200 and mobile phone 300 exist within a power supply range, the power supply station 100 according to the first embodiment transmits a magnetic flux pattern, thereby charging the camera 200 and mobile phone 300. The power supply range is a predetermined range in which the camera 200 and mobile phone 300 can receive a magnetic flux pattern from the power supply station 100.

When neither the camera 200 nor the mobile phone 300 exists within the power supply range, the power supply station 100 cannot charge them even when it transmits a magnetic flux pattern.

In the first embodiment, the following description will be given with reference to FIG. 1 under the assumption that when the user places the camera 200 and mobile phone 300 on the power supply station 100, they exist within the power supply range. Note that when the user removes the camera 200 and mobile phone 300 from the power supply station 100, they do not exist within the power supply range. Also, in the following description, a case in which the user sets the camera 200 and mobile phone 300 close to the power supply range of the power supply station 100 will be handled in the same manner as in the case in which the user places the camera 200 and mobile phone 300 on the power supply station 100. In this case, in the following description, a case in which the user does not set the camera 200 and mobile phone 300 close to the power supply range of the power supply station 100 will be handled in the same manner as in the case in which the user removes the camera 200 and mobile phone 300 from the power supply station 100.

The power supply station 100 causes the secondary coils included in the camera 200 and mobile phone 300 to generate induced electromotive forces by electromagnetic induction by generating a magnetic flux pattern on the power supply station 100 using a supplied commercial power supply. Note that the power supply station 100 of the first embodiment includes an operation unit 103 and display unit 104, and can cause the user to set a charge mode of the power supply station 100 by displaying a GUI (Graphical User Interface). The power supply station 100 of the first embodiment has a plurality of charge modes. When the camera 200 and mobile phone 300 are placed on the power supply station 100, the power supply station 100 decides power supply priority levels of the camera 200 and mobile phone 300 according to each charge mode.

When the camera 200 and mobile phone 300 are placed on the power supply station 100, they can be charged by a magnetic flux pattern transmitted from the power supply station 100.

In the first embodiment, the power supply station 100 has three charge modes, that is, first, second, and third modes. Each of the first, second, and third modes preferentially charges one of the plurality of power receiving apparatuses as follows.

First mode: selects a power receiving apparatus having a lowest remaining capacity of a secondary battery attached to the power receiving apparatus.

Second mode: selects a power receiving apparatus having a shortest operable time period in which the power receiving apparatus is operable by electric power supplied from the attached secondary battery.

Third mode: selects a power receiving apparatus having a longest time period until the secondary battery attached to the power receiving apparatus reaches a full charge state.

Note that the following description will be given under the assumption that the remaining capacity in the first embodiment is defined by, for example, a remaining capacity rate indicating a ratio of the remaining capacity of the secondary battery attached to the power receiving apparatus to a full charge capacity. Also, in the full charge state, for example, the remaining capacity rate of the secondary battery is 100%.

In this manner, the power supply station 100 supplies electric power to one power receiving apparatus selected according to the charge mode until the secondary battery attached to the selected power receiving apparatus reaches a predetermined remaining capacity. When the secondary battery attached to the selected power receiving apparatus has reached the predetermined remaining capacity, the power supply station 100 selects one of the plurality of power receiving apparatuses again according to the charge mode of itself. The power supply station 100 supplies electric power to the selected power receiving apparatus again until the secondary battery attached to the selected power receiving apparatus reaches the predetermined remaining capacity. In this way, the power supply station 100 supplies electric power by a power supply method corresponding to each charge mode so that the secondary batteries attached to the camera 200 and mobile phone 300, which exist within the power supply range of the power supply station 100, have even remaining capacities.

Figure 2:
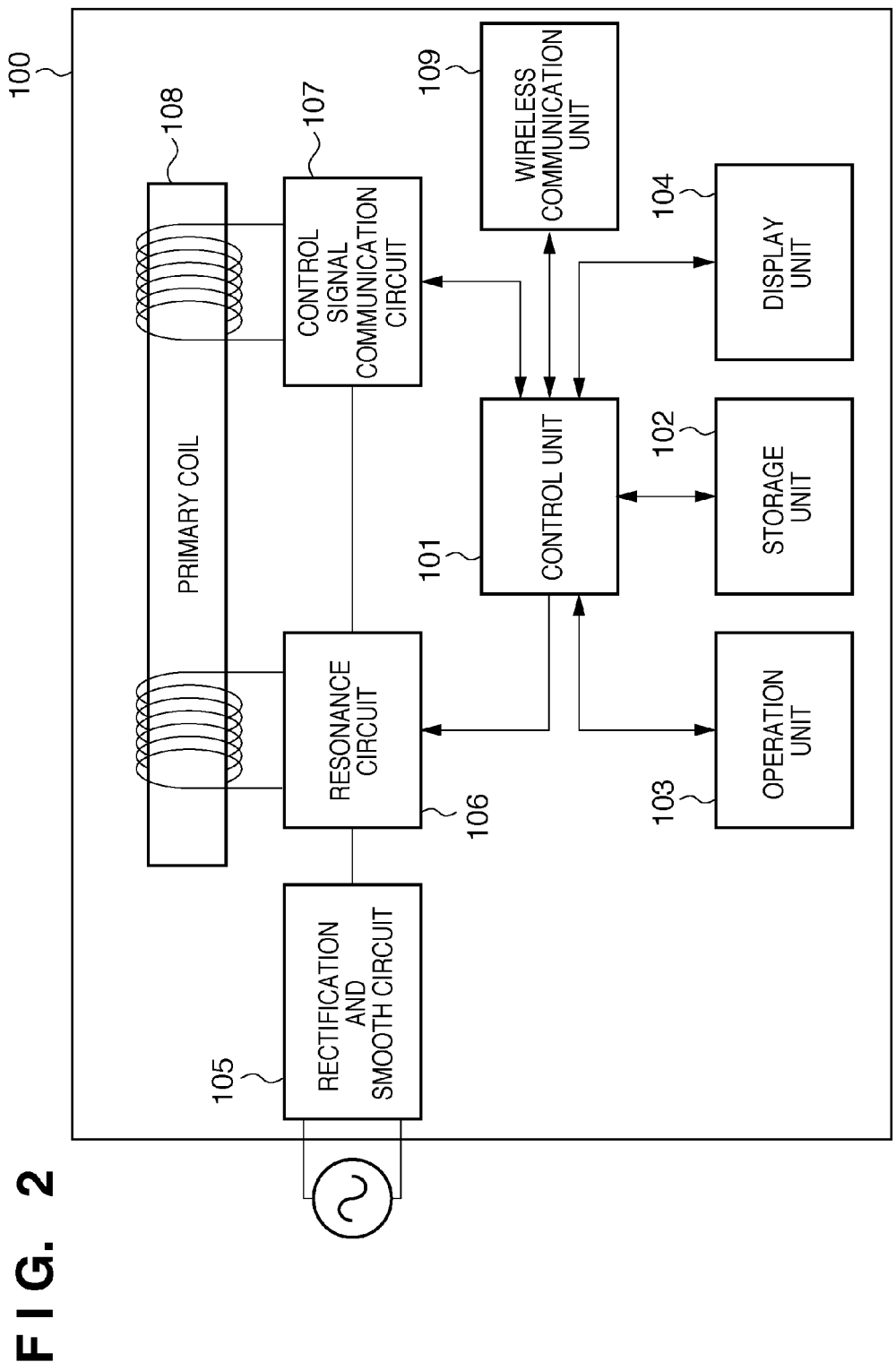
FIG. 2 is a block diagram illustrating an example of a configuration of a power supply station according to the first embodiment.

FIG. 2 is a block diagram showing the arrangement of the power supply station 100 according to the first embodiment of the present invention.

The power supply station 100 has a control unit 101, storage unit 102, operation unit 103, display unit 104, rectification and smooth circuit 105, resonance circuit 106, control signal communication circuit 107, primary coil 108, and wireless communication unit 109.

The control unit 101 is, for example, a CPU, which reads out operation programs of respective blocks of the power supply station 100, which are stored in the storage unit 102, and controls the operations of the respective blocks. The control unit 101 has a timer (not shown) which measures an elapsed time period since each block starts an operation.

The storage unit 102 is a rewritable nonvolatile memory, and stores information such as parameters required for the operations of the respective blocks in addition to the operation programs of the respective blocks included in the power supply station 100. Also, the storage unit 102 stores a device table which is used to manage the camera 200 and mobile phone 300 placed on the power supply station 100, and a group table which is used to manage the camera 200 and mobile phone 300 as a group.

The device table is used to manage identification information of each power receiving apparatus placed on the power supply station 100 within a predetermined time period, and charge information indicating charge statuses of the power receiving apparatus. The storage unit 102 separately records the device tables in correspondence with detection timings of existence of the power receiving apparatuses on the power supply station 100. The charge information indicates the charge statuses including the remaining capacity rate and operable time period of the power receiving apparatus, and a time period required until a secondary battery attached to the power receiving apparatus reaches a full charge state. In the first embodiment, for example, the device table manages identification information and charge information of the camera 200 placed on the power supply station 100. Also, the device table manages identification information and charge information of the mobile phone 300 placed on the power supply station 100. Note that the device table is a table, as shown in, for example, FIG. 3A.

The group table is used to manage the number of power receiving apparatuses placed on the power supply station 100 within a predetermined time period as one group, and is managed in association with the device table generated at the same timing. In the first embodiment, for example, when the mobile phone 300 is placed on the power supply station 100 within a predetermined time period since the camera 200 is placed on the power supply station 100, the camera 200 and mobile phone 300 are managed as one group. The group table manages power receiving apparatuses which exist on the power supply station 100 while dividing them into different groups in time series. Also, the group table associates a group number as identification information of each group, the number of power receiving apparatuses in each group, and the device table corresponding to that group with each other. Note that the group table is a table, as shown in, for example, FIG. 3B.

Assume that the control unit 101 acquires the identification information and charge information of the camera 200 from the camera 200 via the wireless communication unit 109. Also, assume that the control unit 101 acquires the identification information and charge information of the mobile phone 300 from the mobile phone 300 via the wireless communication unit 109.

The operation unit 103 is an input interface used to accept operation inputs from the user. The operation unit 103 has a menu button, select button, and the like. The operation unit 103 transmits a signal corresponding to an operation input from the user to the control unit 101.

The display unit 104 is, for example, a display device such as a compact LCD, and displays GUI data of, for example, a menu screen and charge mode select screen stored in the storage unit 102. In the first embodiment, the user can select one of the plurality of charge modes of the power supply station 100 by operating the operation unit 103 while viewing the charge mode select screen displayed on the display unit 104.

The rectification and smooth circuit 105 converts an input AC voltage into a DC voltage, and removes pulsing components included in the converted DC voltage. The DC voltage converted by the rectification and smooth circuit 105 is supplied to the resonance circuit 106. The resonance circuit 106 oscillates a high frequency required to cause the primary coil 108 to generate a power supply magnetic flux pattern (to be referred to as "first magnetic flux pattern" hereinafter) using electric power supplied from the rectification and smooth circuit 105. Note that the control unit 101 decides a target value of the strength of the first magnetic flux pattern generated by the primary coil 108.

The resonance circuit 106 oscillates a high frequency required to generate the first magnetic flux pattern corresponding to the target value decided by the control unit 101. In order to cause the primary coil 108 to generate a communication magnetic flux pattern (to be referred to as "second magnetic flux pattern" hereinafter), which is different from the first magnetic flux pattern and is required to transmit a control signal (to be referred to as "command" hereinafter), the control signal communication circuit 107 oscillates a frequency based on the command in accordance with a predetermined protocol. Also, the resonance circuit 106 detects a power consumption consumed when the power supply station 100 transmits the first magnetic flux pattern to the camera 200 and mobile phone 300. The control unit 101 can determine in accordance with a variation of power consumption detected by the resonance circuit 106 that at least one of the camera 200 and mobile phone 300 exists on the power supply station 100.

The primary coil 108 can generate the second magnetic flux pattern by oscillations of the resonance circuit 106 and control signal communication circuit 107. Assume that the second magnetic flux pattern generated by the primary coil 108 is output in a direction perpendicular to the power supply station 100. Note that the second magnetic flux pattern includes a command.

The second magnetic flux pattern generated on the primary coil 108 by the control signal communication circuit 107 will be described below. The second magnetic flux pattern is transmitted to the camera 200 and mobile phone 300 while being superposed on the first magnetic flux pattern. A command includes a preamble, destination identifier, command code, and CRC. The command included in the second magnetic flux pattern is generated when the control signal communication circuit 107 oscillates a frequency required to cause the primary coil 108 to generate excitations of a predetermined strength. The generated command is transmitted to the camera 200 and mobile phone 300 as pulse signals. The transmitted pulse signals are recognized by the camera 200 and mobile phone 300 as bit data including information of "1" and "0". The camera 200 and mobile phone 300 recognize the command by analyzing the pulse signals as the bit data.

The preamble is used to synchronize packet communications between the power supply station 100, and the camera 200 and mobile phone 300. The preamble includes a bit pattern which skips an excitation at the 32nd transmission timing after periodic excitations by the pulse signals are repeated 31 times, and is output from the primary coil 108 by the control signal communication circuit 107.

The destination identifier includes identification information used to identify a power receiving apparatus. Note that the destination identifier may include identification information of one or both of the camera 200 and mobile phone 300 in case of the first embodiment.

The command code is a signal used to control the power receiving apparatus designated by the aforementioned identification information to perform a specific operation. In case of the first embodiment, the command code is a signal for controlling at least one of the camera 200 and mobile phone 300 to execute an operation designated by the command code.

The power supply station 100 of the first embodiment can control the power receiving apparatus corresponding to the identification information included in the destination identifier to execute a specific operation designated by the command code. In the first embodiment, when the destination identifier includes identification information of one of the camera 200 and mobile phone 300, the power supply station 100 can control a power receiving apparatus as one of the camera 200 and mobile phone 300. Alternatively, in the first embodiment, when the destination identifier includes pieces of identification information of the camera 200 and mobile phone 300, the power supply station 100 can control the camera 200 and mobile phone 300.

The CRC is information used to check whether or not a bit sequence of data of the second magnetic flux pattern is correctly transmitted.

The wireless communication unit 109 is an interface required for the power supply station 100 to communicate with the camera 200 and mobile phone 300 by wireless. In the first embodiment, the wireless communication unit 109 communicates with the camera 200 and mobile phone 300 by wireless, respectively, using a wireless communication method compliant with the wireless LAN communication standards such as IEEE802.11a, b, or g. Note that the wireless communication unit 109 may communicates with the camera 200 and mobile phone 300 using a wireless communication method other than the wireless LAN communication standards such as IEEE802.11a, b, or g.

Figure 4:
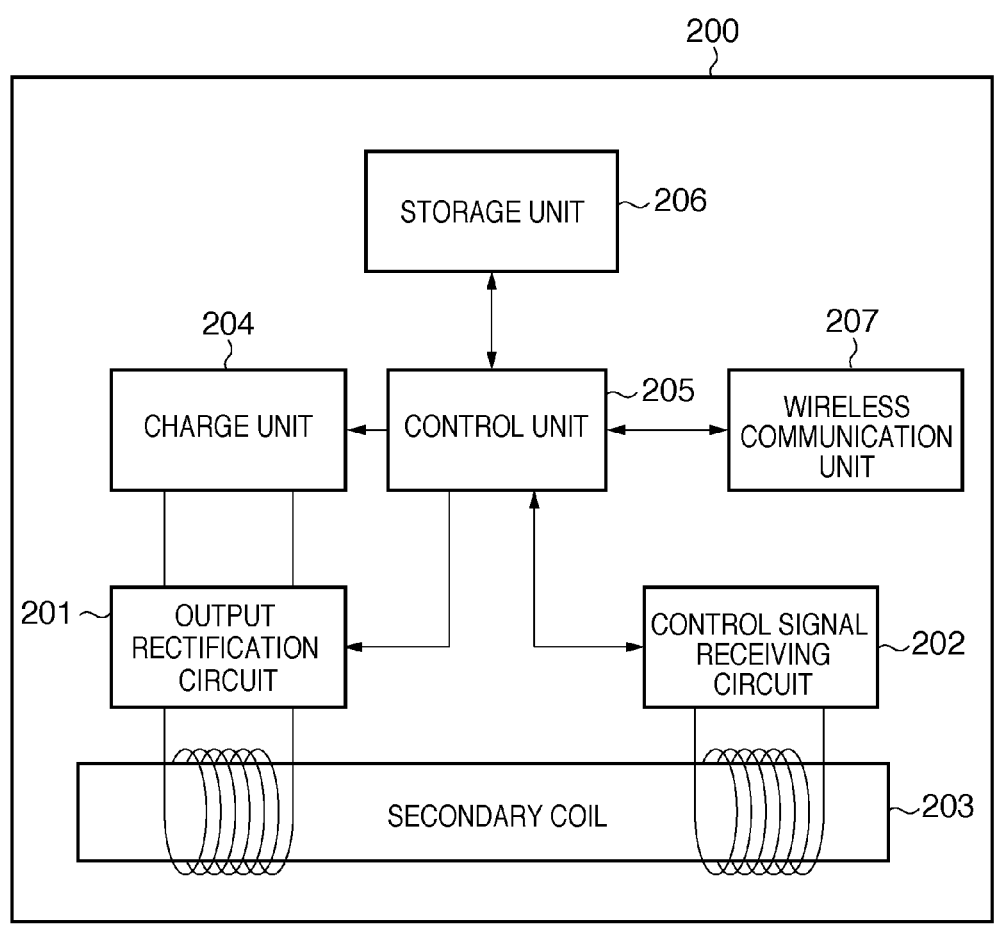
FIG. 4 is a block diagram illustrating an example of a camera according to the first embodiment.

FIG. 4 is a block diagram showing the arrangement of the camera 200 according to the first embodiment of the present invention. The camera 200 has an output rectification circuit 201, control signal receiving circuit 202, secondary coil 203, charge unit 204, control unit 205, storage unit 206, and wireless communication unit 207.

The output rectification circuit 201 generates a charge DC electric power by removing the superposed second magnetic flux pattern and noise from an induced electromotive force generated on the secondary coil 203, and supplies it to the charge unit 204.

The control signal receiving circuit 202 detects components of the second magnetic flux pattern transmitted from the power supply station 100 from the induced electromotive force generated on the secondary coil 203, and analyzes the second magnetic flux pattern according to the protocol of the command. The control signal receiving circuit 202 outputs the analysis result of the command analyzed from the second magnetic flux pattern to the control unit 205.

When the camera 200 exists on the power supply station 100 in a power receiving state, an induced electromotive force is generated on the secondary coil 203 by a change in first magnetic flux pattern generated by the primary coil 108 of the power supply station 100.

The charge unit 204 supplies the DC electric power supplied from the output rectification circuit 201 to a secondary battery (not shown) attached to the camera 200, thereby charging the secondary battery (not shown). Also, the charge unit 204 calculates the remaining capacity rate of the attached secondary battery, and supplies it to the control unit 205.

The control unit 205 is, for example, a CPU, which controls the operations of respective blocks by reading out and executing operation programs of the respective blocks of the camera 200, which are stored in the storage unit 206.

The control unit 205 compares the CRC with the received second magnetic flux pattern to check whether or not a data bit sequence of the second magnetic flux pattern is correctly transmitted. When the control signal receiving circuit 202 determines that the data bit sequence of the second magnetic flux pattern is correctly transmitted, the control unit 205 compares identification information included in the destination identifier with that of the camera 200 stored in the storage unit 206. When the identification information included in the destination identifier corresponds with identification information of the camera 200 stored in the storage unit 206, the control unit 205 determines that the received command is an operation instruction to the camera 200. In this case, the control unit 205 executes an operation designated by the command code. When the identification information included in the destination identifier does not correspond with the identification information of the camera 200 stored in the storage unit 206, the control unit 205 does not execute an operation designated by the command code. The identification information of the camera 200 stored in the storage unit 206 is, for example, a MAC address.

Also, the control unit 205 determines whether or not the secondary battery (not shown) connected to the camera 200 is fully charged. When the secondary battery (not shown) attached to the camera 200 is in a full charge state, the control unit 205 changes the state of the camera 200 to a power receiving stop state. When the secondary battery (not shown) is not in a full charge state, the control unit 205 changes the state of the camera 200 to a power receiving state. In the power receiving stop state, even when the first magnetic flux pattern generated by the primary coil 108 of the power supply station 100 causes the secondary coil 203 to generate an induced electromotive force, the output rectification circuit 201 is controlled not to supply any electric power to the charge unit 204. That is, in the power receiving stop state, the control unit 205 controls not to operate at least the output rectification circuit 201. In this case, since no induced electromotive force generated by magnetic induction is supplied to the charge unit 204, the charge unit 204 cannot charge the secondary battery (not shown). In the power receiving state, the secondary battery (not shown) is charged by using an induced electromotive force generated on the secondary coil 203 based on the first magnetic flux pattern generated by the primary coil 108 of the power supply station 100. When the camera 200 is in the power receiving state, it can receive the first and second magnetic flux patterns.

The control unit 205 calculates an operable time period, in which the camera 200 is operable by electric power supplied from the secondary battery, using the remaining capacity rate of the secondary battery supplied from the charge unit 204. Also, the control unit 205 calculates a time period required until the secondary battery attached to the camera 200 reaches a full charge state, using the remaining capacity rate of the secondary battery supplied from the charge unit 204. When the control unit 205 calculates the operable time period and the time period required until the full charge state, it stores them in the storage unit 206 together with the remaining capacity rate of the secondary battery as the charge information of the camera 200. Note that the operable time period includes, for example, a time period that uses the camera 200 to capture images of objects, a time period that uses the camera 200 to reproduce captured images, and a time period that uses the camera 200 to transmit captured images to an external apparatus. The time period required until the camera 200 reaches the full charge state defines a time period required to charge the secondary battery attached to the camera 200 until the full charge state.

The storage unit 206 is a rewritable nonvolatile memory, and stores the identification information and charge information of the camera 200 in addition to the operation programs of the respective blocks of the camera 200. Note that the identification information of the camera 200 is, for example, a MAC address. Also, the charge information of the camera 200 includes the remaining capacity rate and operable time period of the camera 200, and the time period required until the secondary battery attached to the camera 200 reaches the full charge state. The charge information of the camera 200 may be either information calculated by the control unit 205 or that which can be acquired from the secondary battery (not shown) by the control unit 205.

The wireless communication unit 207 is an interface used for the camera 200 to communicate with the power supply station 100 by wireless. In the first embodiment, the wireless communication unit 207 individually communicates with the power supply station 100 using a communication method of the wireless LAN communication standards such as IEEE802.11a, b, or g by wireless. Note that the wireless communication unit 207 may communicate with the power supply station 100 using a communication method other that of the wireless LAN communication standards such as IEEE802.11a, b, or g.

Note that the camera 200 further has an image capture unit which generates image data by capturing an image of an object, and stores the generated image data in the storage unit 206.

Note that the mobile phone 300 has an output rectification circuit 301, control signal receiving circuit 302, secondary coil 303, charge unit 304, control unit 305, storage unit 306, and wireless communication unit 307. The arrangements and operations of the output rectification circuit 301, control signal receiving circuit 302, secondary coil 303, charge unit 304, control unit 305, storage unit 306, and wireless communication unit 307 correspond with those of the arrangements included in the camera 200. For this reason, a description about the mobile phone 300 will not be given.

(Group Identification Process)

Figure 5:
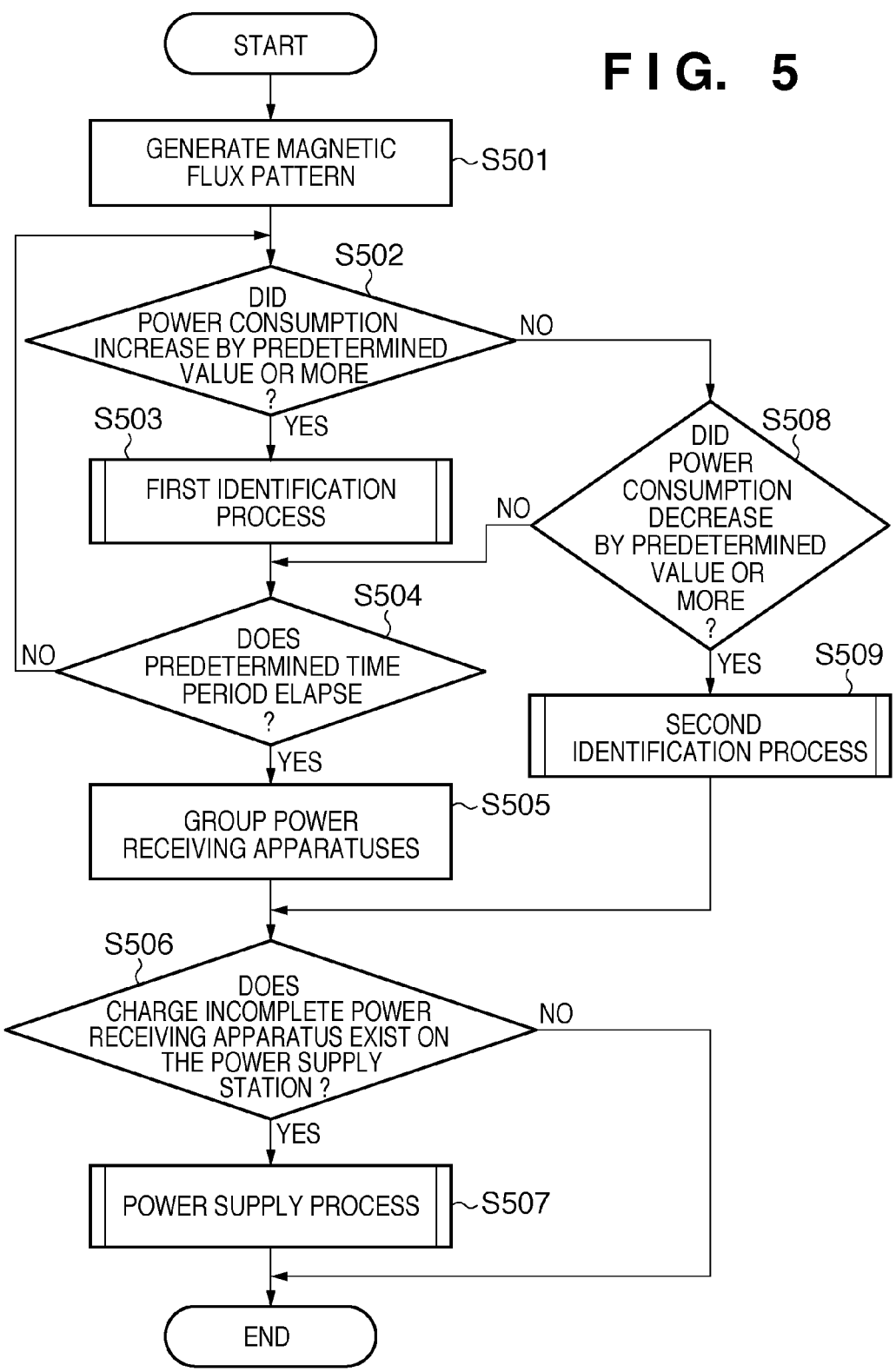
FIG. 5 is a flowchart illustrating an example of group identification process according to the first embodiment.

Group identification process executed by the power supply station 100 of the first embodiment will be described below with reference to the flowchart of FIG. 5. The group identification process corresponding to the flowchart of FIG. 5 can be executes when the control unit 101 executes a computer program stored in the storage unit 102. Note that the group identification process is executed by the power supply station 100 when the charge mode of the power supply station 100 is changed to one of the first, second, and third modes, and the power supply station 100 begins to supply electric power to the camera 200 and mobile phone 300.

In step S501, the control unit 101 controls the resonance circuit 106 to oscillate a frequency required to cause the primary coil 108 to generate the first magnetic flux pattern. The primary coil 108 generates the first magnetic flux pattern according to the frequency oscillated by the resonance circuit 106, and begins to transmit the generated first magnetic flux pattern. The first magnetic flux pattern is a magnetic flux which changes periodically like, for example, a sinusoidal wave. When the first magnetic flux pattern is transmitted, the control unit 101 advances the process to step S502.

In step S502, the control unit 101 determines whether or not a power consumption detected by the resonance circuit 106 increased by a predetermined value or more.

When the camera 200 is placed on the power supply station 100 in a state in which neither the camera 200 nor the mobile phone 300 exists on the power supply station 100, the power consumption detected by the resonance circuit 106 increases by the predetermined value or more. This is because the camera 200 receives the first magnetic flux pattern, and causes the secondary coil 203 to generate an electromotive force according to the received first magnetic flux pattern, thus starting to charge the secondary battery. Assume that the camera 200 placed on the power supply station 100 is set in a power receiving state at that time.

Likewise, when the mobile phone 300 is placed on the power supply station 100 in a state in which the camera 200 exists on the power supply station 100 but the mobile phone 300 does not exist on the power supply station 100, the power consumption detected by the resonance circuit 106 increases by the predetermined value or more.

When the power consumption detected by the resonance circuit 106 increased by the predetermined value or more, the control unit 101 determines that at least one of the camera 200 and mobile phone 300 performs charging using an electromotive force generated based on the first magnetic flux pattern transmitted from the primary coil 108. Thus, the control unit 101 determines whether or not a new power receiving apparatus is placed on the power supply station 100 by checking whether or not the power consumption detected by the resonance circuit 106 increased by the predetermined value or more.

When the power consumption increased by the predetermined value or more, the control unit 101 determines that a new power receiving apparatus exists on the power supply station 100, and advances the process to step S503. The new power receiving apparatus means a power receiving apparatus which is not registered in the device table. When the power consumption did not increase by the predetermined value or more, the control unit 101 determines that a new power receiving apparatus is not placed on the power supply station 100, and advances the process to step S508.

In step S503, the control unit 101 executes first identification process. The first identification process is executed to add identification information and charge information of the new power receiving apparatus which is determined to exist on the power supply station 100 to the device table. The first identification process will be described later. When the first identification process is executed, the control unit 101 advances the process to step S504.

In step S504, the control unit 101 determines whether or not a measurement time period measured by the timer (not shown) of the control unit 101 reaches a predetermined time period. The measurement time period is measured by the timer (not shown) after it is detected that the new power receiving apparatus is placed on the power supply station 100. In the first embodiment, when the camera 200 is placed on the power supply station 100 from a state in which neither the camera 200 nor the mobile phone 300 is placed on the power supply station 100, the control unit 101 starts to measure the measurement time period since determination of existence of the power receiving apparatus. Note that the predetermined time period as a threshold of the measurement time period defines a time period required to decide power receiving apparatuses to be managed as a group upon grouping the camera 200 and mobile phone 300, as will be described later. If it is determined that the measurement time period is not less than the predetermined time period, the control unit 101 advances the process to step S505. If it is determined that the measurement time period has not reached the predetermined time period yet, the control unit 101 returns the process to step S502.

In step S505, the control unit 101 groups the camera 200 and mobile phone 300 added to the device table before the measurement time period reaches the predetermined time period. The plurality of grouped power receiving apparatuses are registered in the group table which manages a group number and the number of power receiving apparatuses in the group.

"Grouping" is process for dividing a plurality of power receiving apparatuses added to the device table before the measurement time period reaches the predetermined time period into one group so as to control them by one command. Groups of power receiving apparatuses divided by grouping are managed by the group table stored in the storage unit 102, as shown in FIG. 3B. The groups of power receiving apparatuses are divided in chronological order depending on the detection timings of their existence on the power supply station 100, and are assigned group numbers. The groups assigned the group numbers are registered in the storage unit 102 together with the numbers of power receiving apparatuses in the groups.

Assume that power receiving apparatuses grouped in step S505 are not redundantly registered in a plurality of groups in the group table.

For example, when the camera 200 and mobile phone 300 are added to the device table before the measurement time period reaches the predetermined time period, they are registered as a group of a group number "1" in FIG. 3B. At this time, the device table registered in association with the group number "1" is that shown in FIG. 3A. The group of the group number "1" has the number of power receiving apparatuses=2 in the group, and is associated with the device table including the camera 200 and mobile phone 300.

When the group number and the number of power receiving apparatuses in the group are registered in the group table, the control unit 101 advances the process to step S506.

In step S506, the control unit 101 refers to the device table stored in the storage unit 102 and determines whether or not a charge incomplete power receiving apparatus exists. The control unit 101 determines whether or not a charge incomplete power receiving apparatus is registered in the group table, in accordance with at least one of the remaining capacity rates of the power receiving apparatuses and time periods required until the secondary batteries of the power receiving apparatuses reach a full charge state in the device table stored in the storage unit 102.

If a charge incomplete power receiving apparatus is registered in the group table, the control unit 101 advances the process to step S507. If a charge incomplete power receiving apparatus is not registered in the group table, the control unit 101 ends the process.

In step S507, the control unit 101 starts power supply process required to supply electric power to the camera 200 and mobile phone 300. Note that the power supply process will be described later. When the power supply process is executed, the control unit 101 ends the process.

In step S508, the control unit 101 determines whether or not the power consumption detected by the resonance circuit 106 decreased by a predetermined value or more.

When the power consumption detected by the resonance circuit 106 decreased by the predetermined value or more, the control unit 101 determines that at least one of the secondary coils 203 and 303 stops to charge the secondary battery due to an electromotive force based on the first magnetic flux pattern.

When the camera 200 is removed from the power supply range of the power supply station 100 in a state in which the camera 200 and mobile phone 300 exist on the power supply station 100, the camera 200 can no longer receive any magnetic flux pattern from the power supply station 100. In this case, since the camera 200 can no longer receive the second and first magnetic flux patterns, the control unit 101 determines that no electromotive force is generated on the secondary coil 203. Likewise, when the mobile phone 300 is removed from the power supply station 100 in a state in which the camera 200 and mobile phone 300 exist on the power supply station 100, the mobile phone 300 can no longer receive any magnetic flux pattern from the power supply station 100.

When charging of the camera 200 is complete in a state in which the camera 200 and mobile phone 300 exist on the power supply station 100, the camera 200 changes itself to the power receiving stop state so as to stop charging by the magnetic flux patterns output from the power supply station 100. Also, when charging of the mobile phone 300 is complete in a state in which the camera 200 and mobile phone 300 exist on the power supply station 100, the mobile phone 300 changes itself to the power receiving stop state so as to stop charging by the magnetic flux patterns output from the power supply station 100.

When charging of the secondary battery attached to the camera 200 is complete while the camera 200 receives electric power from the power supply station 100, the power consumption detected by the resonance circuit 106 is decreased by the predetermined value or more. Also, when charging of the secondary battery attached to the mobile phone 300 is complete while the mobile phone 300 receives electric power from the power supply station 100, the power consumption detected by the resonance circuit 106 decreased by the predetermined value or more.

Then, the control unit 101 determines one of the following cases by checking whether or not the power consumption detected by the resonance circuit 106 decreased by the predetermined value or more. That is, the control unit 101 determines that at least one of the camera 200 and mobile phone 300 is removed from the power supply range, or at least one power receiving apparatus completes charging of the secondary battery.

Note that when charging of the power receiving apparatus which receives electric power from the power supply station 100 is complete, the control unit 101 determines in the same manner as in the case in which the power receiving apparatus is removed from the power supply station 100, and a description of such case will not be given.

When the power consumption decreased by the predetermined value or more, the control unit 101 determines that the power receiving apparatus is removed from the power supply station 100, and advances the process to step S509. If the power consumption did not decrease by the predetermined value or more, the control unit 101 determines that no power receiving apparatus is removed from the power supply station 100, and advances the process to step S504.

In step S509, the control unit 101 executes second identification process. The second identification process is executed to delete the identification information and charge information of the power receiving apparatus which is determined to be removed from the power supply station 100. The second identification process will be described later. Upon execution of the second identification process, the control unit 101 advances the process to step S506.

Note that the predetermined time period in which power receiving apparatuses to be divided into an identical group in the group power supply process is an arbitrary time period, and it may be set by the user. The measurement time period is reset after the camera 200 and mobile phone 300 which are determined to exist on the power supply station 100 are grouped. When the control unit 101 determines that a new power receiving apparatus exists on the power supply station 100, the measurement time period is measured again by the timer (not shown). Note that a power receiving apparatus which is determined to exist on the power supply station 100 after the camera 200 and mobile phone 300 are grouped is divided into a group different from that of the camera 200 and mobile phone 300.

Also, the predetermined value as a threshold of a change in electric power amount required to determine placement, removal, and charge completion of a power receiving apparatus in the group power supply process need only be a value that allows to detect that one of the camera 200 and mobile phone 300 starts charging.

In the group table, the group table need only identify a group of power receiving apparatuses, and it may be character information such as an alphabet other than the number. In the group table, the group number, the number of power receiving apparatuses in the group, and power supply related information to the power receiving apparatuses other than the device table may be registered in association with each other.

Also, in the device table, pieces of information other than the identification information and charge information of the power receiving apparatus may be registered in association with each other.

(First Identification Process)

Figure 6:
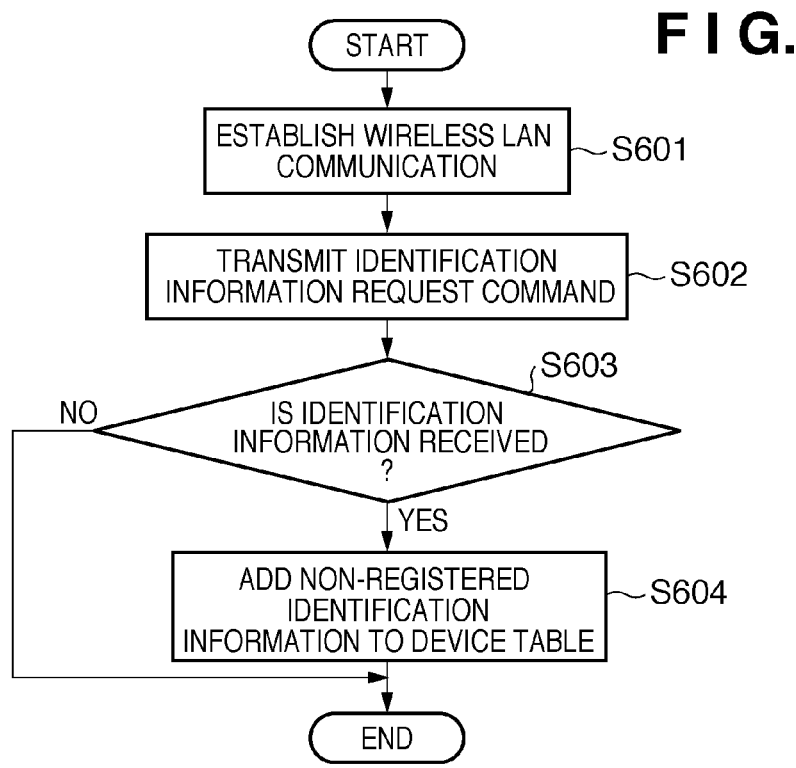
FIG. 6 is a flowchart illustrating an example of first identification process according to the first embodiment.

The first identification process executed by the power supply station 100 of the first embodiment will be described further using the flowchart of FIG. 6. Note that the first identification process will be explained while taking as an example a case in which the camera 200 and mobile phone 300 are placed on the power supply station 100.

In step S601, the control unit 101 controls the wireless communication unit 109 to establish communication connections with the camera 200 and mobile phone 300. In order to establish communication connections with the camera 200 and mobile phone 300, the control unit 101 controls the wireless communication unit 109 to periodically transmit beacon packets including ESSID information of the power supply station 100 to the camera 200 and mobile phone 300. Upon reception of the beacon packets, the camera 200 and mobile phone 300 establish communication connections with the power supply station 100 using the ESSID included in the received beacon packets.

When the wireless communication unit 109 receives packets required to establish a communication connection from the camera 200, the control unit 101 confirms if an ESSID included in the packets is that of the power supply station 100. If the control unit 101 confirms that the ESSID included in the packets matches that of the power supply station 100, it establishes a communication connection between the power supply station 100 and camera 200.

Likewise, when the wireless communication unit 109 receives packets required to establish a communication connection from the mobile phone 300, the control unit 101 confirms if an ESSID included in the packets matches that of the power supply station 100. If the control unit 101 confirms that the ESSID included in the packets matches that of the power supply station 100, it establishes a communication connection between the power supply station 100 and mobile phone 300.

When the wireless communication unit 109 establishes communication connections with the camera 200 and mobile phone 300, the control unit 101 advances the process to step S602.

In step S602, the control unit 101 controls the control signal communication circuit 107 to transmit an identification information request command to the camera 200 and mobile phone 300 which exist on the power supply station 100. The identification information request command is used to request to transmit identification information of a power receiving apparatus to the power supply station 100 via a wireless LAN communication. Note that the identification information request command is transmitted to all the power receiving apparatuses which exist on the power supply station 100 in step S602. Note that the identification information requested to the power receiving apparatus using the identification information request command may be, for example, MAC addresses of the camera 200 and mobile phone 300.

In step S603, the control unit 101 checks whether or not the wireless communication unit 109 receives identification information of the camera 200 and that of the mobile phone 300. When the wireless communication unit 109 receives identification information of the camera 200 and that of the mobile phone 300, the control unit 101 determines that the camera 200 and mobile phone 300 exist on the power supply station 100, and advances the process to step S604. If the wireless communication unit 109 receives neither identification information of the camera 200 nor that of the mobile phone 300, the control unit 101 ends the first identification process.

In step S604, when the control unit 101 refers to the device table and determines that the identification information received by the wireless communication unit 109 is not registered in the device table. If the control unit 101 determines that the identification information received by the wireless communication unit 109 is not registered in the device table, it generates a new device table and adds the identification information received by the wireless communication unit 109 in step S603 to that table. When the identification information received by the wireless communication unit 109 in step S603 has already been registered in the device table, the control unit 101 does not register the received identification information.

That is, the control unit 101 determines whether or not the identification information received by the wireless communication unit 109 in step S603 is not registered in the device table with reference to all pieces of identification information registered in the device tables associated with all groups. When no device table is stored, the pieces of identification information of all the power receiving apparatuses received by the wireless communication unit 109 in step S603 are added to a newly generated device table. Note that the control unit 101 also acquires charge information of each new power receiving apparatus added to the device table from the power receiving apparatus via a wireless LAN communication, and adds it to the device table together with the identification information.

When the control unit 101 generates a new device table and adds identification information of a power receiving apparatus which is not registered to the device table, it ends the first identification process.

In the first identification process, the control unit 101 acquires, with reference to all the device tables stored in the storage unit 102, pieces of identification information of power receiving apparatuses already registered in the device tables. Then, the control unit 101 extracts identification information of a power receiving apparatus which is not registered in the device table of those received by the wireless communication unit 109, generates a new device table, and registers the extracted identification information in the device table. In this way, the control unit 101 can manage power receiving apparatuses which exist on the power supply station 100 together using the device table.

(Second Identification Process)

Figure 7:
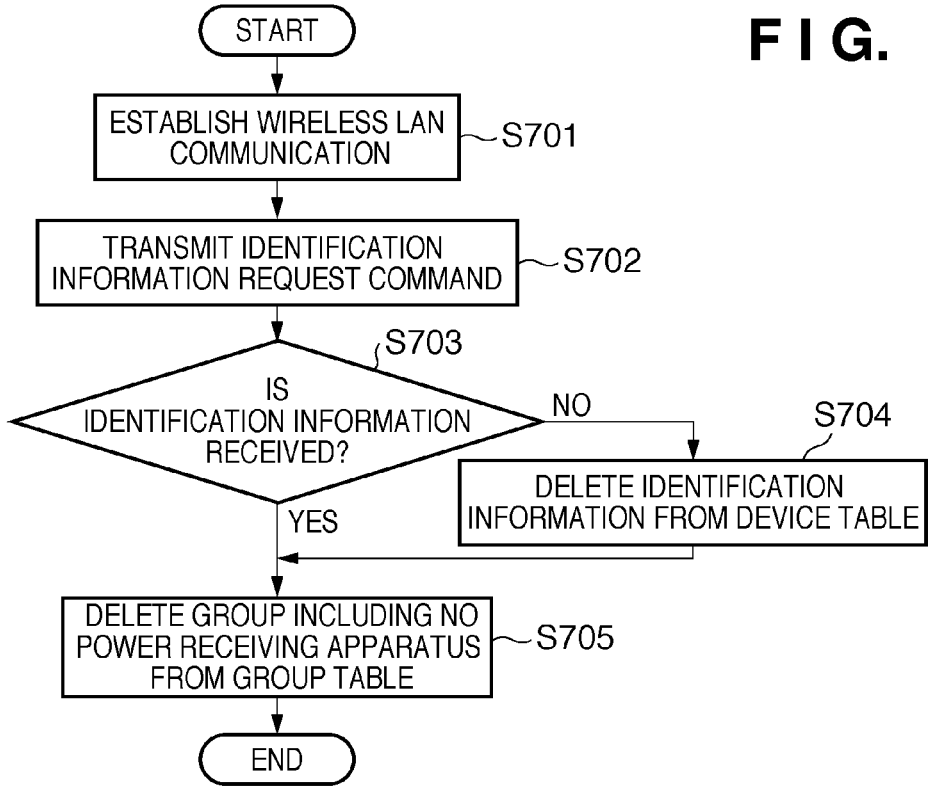
FIG. 7 is a flowchart illustrating an example of second identification process according to the first embodiment.

The second identification process executed by the power supply station 100 of the first embodiment will be described below further using the flowchart of FIG. 7. Note that the second identification process will be described while taking as an example a case in which the camera 200 and mobile phone 300 are placed on the power supply station 100. Also, processes in steps S701 and S702 in the second identification process are the same as those in steps S601 and S602 in the first identification process, and a description thereof will not be repeated.

In step S703, the control unit 101 checks whether or not the wireless communication unit 109 receives the identification information of the camera 200 and that of the mobile phone 300.

When the camera 200 is removed from the power supply range of the power supply station 100, the control unit 205 of the camera 200 cannot receive any identification information request command. For this reason, the control unit 205 does not transmit any identification information of the camera 200 to the power supply station 100 via a wireless LAN communication.

Also, when charging is complete, the control unit 205 of the camera 200 changes the state of the camera 200 itself from the power receiving state to the power receiving stop state, and does not transmit any identification information of the camera 200 to the power supply station 100 even when the identification information request command is received.

The control unit 101 specifies a power receiving apparatus which does not respond to the identification information request command by determining whether or not the wireless communication unit 109 receives the identification information of the camera 200 and that of the mobile phone 300.

When the control unit 101 determines that the wireless communication unit 109 does not receive any identification information of the camera 200, it determines that the camera 200 is not a power supply target of the power supply station 100.

Also, when the wireless communication unit 109 does not receive any identification information of the mobile phone 300, the control unit 101 makes the same judgment as in the case of the camera 200.

When the wireless communication unit 109 receives the identification information of the camera 200 and that of the mobile phone 300, the control unit 101 determines that the camera 200 and mobile phone 300 are power supply targets of the power supply station 100.

When the wireless communication unit 109 receives the identification information of the camera 200 but it does not receive identification information of the mobile phone 300, the control unit 101 determines that the camera 200 is a power supply target of the power supply station 100, but the mobile phone 300 is not a power supply target. In this case, the control unit 101 checks all pieces of identification information registered in the device tables with the identification information of the camera 200 received from the camera 200, and determines that the mobile phone 300 is a power receiving apparatus which does not respond to the identification information request command.

If the control unit 101 determines that the wireless communication unit 109 receives the identification information of the camera 200 and that of the mobile phone 300, it advances the process to step S705.

If the control unit 101 determines that the wireless communication unit 109 does not receive at least one of the identification information of the camera 200 and that of the mobile phone 300, it advances the process to step S704.

In step S704, the control unit 101 deletes the identification information of the power receiving apparatus which does not respond to the identification information request command from the device table. When the identification information of the power receiving apparatus which does not respond to the identification information request command is deleted from the device table, the control unit 101 advances the process to step S705.

In step S705, the control unit 101 decreases 1 from the number of power receiving apparatuses corresponded to the "number of power receiving apparatuses in group" of the group table associated with the device table from which the identification information of the power receiving apparatus is deleted. At this time, when the number of power receiving apparatuses corresponded to the "number of power receiving apparatuses in group" becomes zero, the control unit 101 deletes the group number and the number of power receiving apparatuses in the group which corresponds to the "number of power receiving apparatuses in group"=0 from the group table. In this case, the control unit 101 also deletes the device table associated with the deleted group number from the storage unit 102. When the control unit 101 deletes information associated with the group corresponding to the "number of power receiving apparatuses in group"="0" from the group table, it ends the second identification process.

In the second identification process, the control unit 101 acquires, with reference to the device tables stored in the storage unit 102, pieces of identification information of power receiving apparatuses already registered in the device tables. Then, the control unit 101 specifies a power receiving apparatus which does not respond to the identification information request command from the identification information received by the wireless communication unit 109, and deletes information of that specified power receiving apparatus from the device table and group table. In this way, the control unit

101 can manage power receiving apparatuses as power supply targets of the power supply station 100 together using the device table and group table.

(Power Supply Process)

Figure 8A:
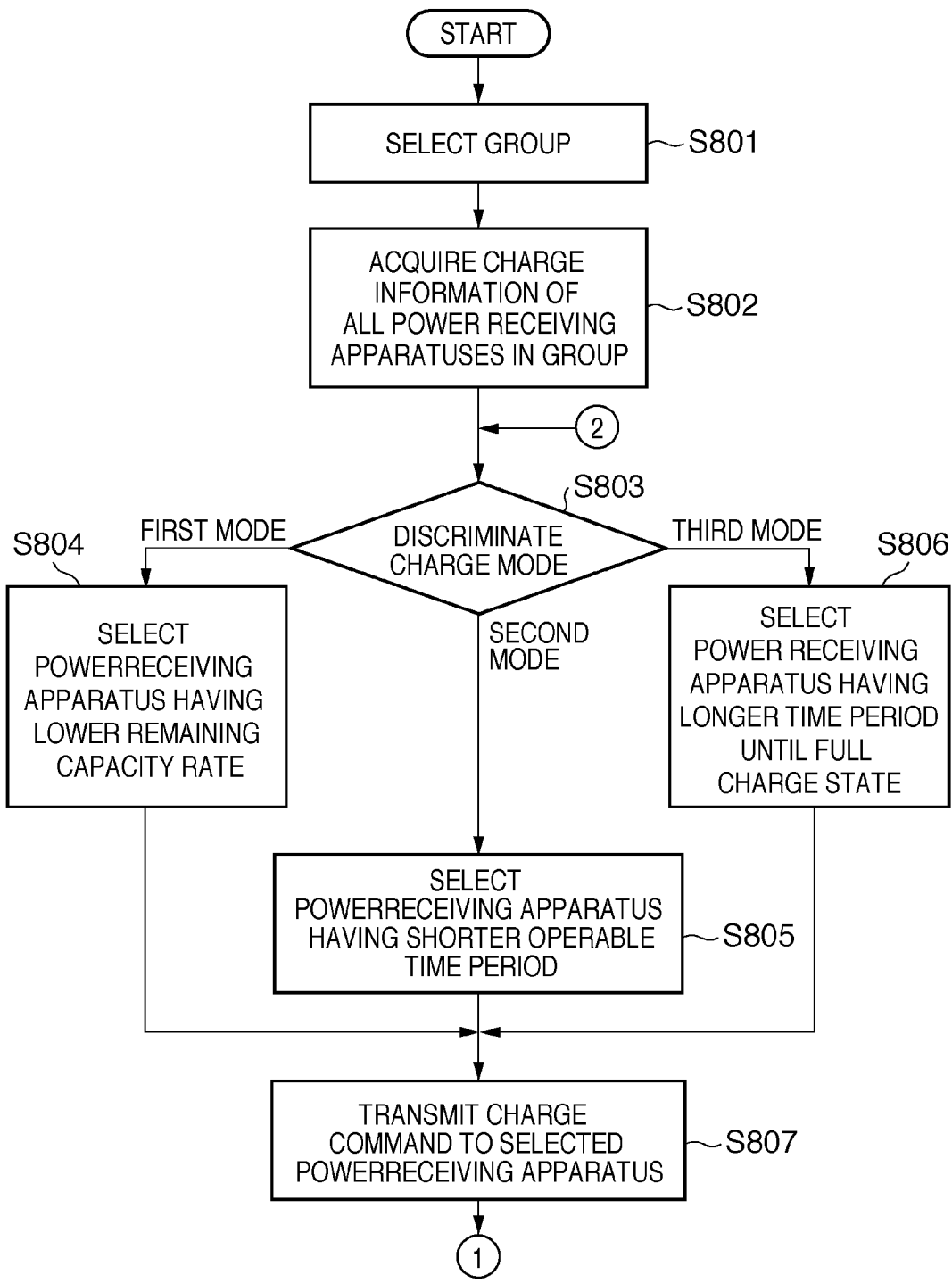
FIGS. 8A and 8B are flowcharts illustrating an example of power supply process according to the first embodiment.
Figure 8B:
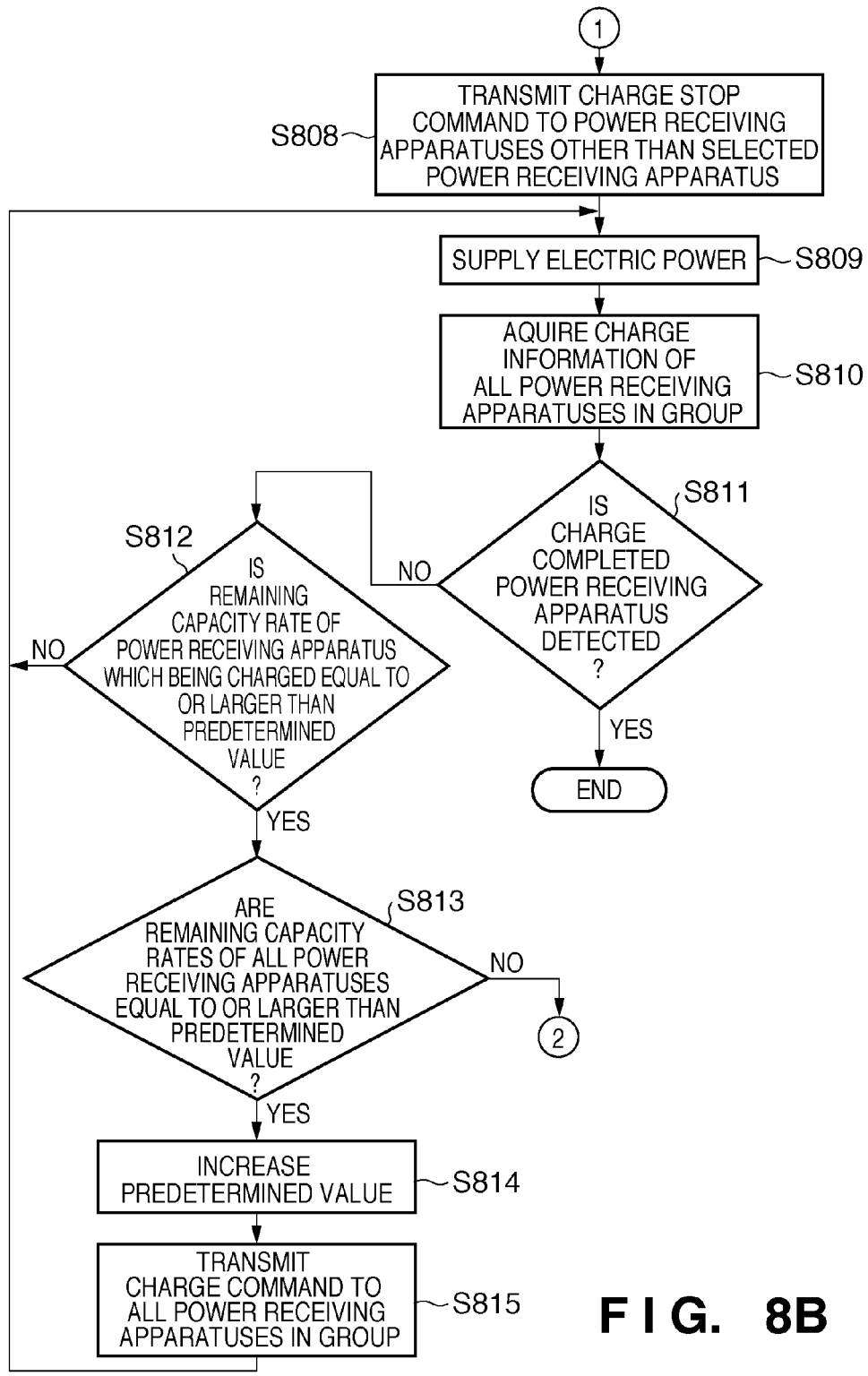

The power supply process executed by the power supply station 100 of the first embodiment will be described below further using the flowcharts of FIGS. 8A and 8B. In the first embodiment, the case will be exemplified below wherein the control unit 101 supplies electric power to the group of power receiving apparatuses of the group number "1" in FIG. 3B.

Also, assume that the camera 200 and mobile phone 300 are registered in the group of the group number "1", the camera 200 is a power receiving apparatus corresponding to identification information 1 shown in FIG. 3A, and the mobile phone 300 is a power receiving apparatus corresponding to identification information 2 shown in FIG. 3A. Note that the power supply process will be described while taking as an example a case in which the camera 200 and mobile phone 300 exist on the power supply station 100. Also, assume that the process in FIGS. 8A and 8B may be executed when a power receiving apparatus other than the camera 200 and mobile phone 300 exists on the power supply station 100. Assume that in this case, the power receiving apparatus other than the camera 200 and mobile phone 300 is registered in a group of a group number "2" different from that of the camera 200 and mobile phone 300, and has a secondary battery (not shown). Furthermore, assume that the camera 200 and mobile phone 300 are set in the power receiving state.

In step S801, the control unit 101 refers to the group table stored in the storage unit 102 to decide the group of the group number "1" from those registered in the group table, so as to execute power supply process corresponding to the charge mode of the power supply station 100. When the control unit 101 selects the group number "1" as a power supply target group, it advances the process to step S802. Note that the control unit 101 decides a power supply target group so as to preferentially execute the power supply process in turn from older groups registered in the group table. When the control unit 101 decides one of groups registered in the group table, it advances the process to step S802.

In step S802, the control unit 101 reads out identification information "1" of the camera 200 and identification information "2" of the mobile phone 300 registered in the group of the group number "1" selected in step S801 from the device table in the storage unit 102 associated with that group. Then, the control unit 101 acquires the identification information "1" of the camera 200 and the identification information "2" of the mobile phone 300. Note that the control unit 101 acquires pieces of charge information of the camera 200 and mobile phone 300 from the camera 200 and mobile phone 300 via the wireless communication unit 109 at that time. The control unit 101 stores the pieces of charge information acquired from the camera 200 and mobile phone 300 in the device table in the storage unit 102. When the charge information of the camera 200 and that of the mobile phone 300 have already been stored in the device table in the storage unit 102, the control unit 101 updates the charge information of the camera 200 and that of the mobile phone 300 in the storage unit 102. When the control unit 101 stores the pieces of charge information acquired from the camera 200 and mobile phone 300 in the storage unit 102, it advances the process to step S803.

In step S803, the control unit 101 checks which of the first, second, and third modes the charge mode of the power supply station 100 is set. When the user selects the charge mode of the power supply station 100 by operating the operation unit 103, information indicating the charge mode selected by the user is stored in the storage unit 102. For this reason, the control unit 101 determines the charge mode of the power supply station 100 based on the information indicating the charge mode stored in the storage unit 102.

If the charge mode of the power supply station 100 is the first mode, the control unit 101 advances the process to step S804. If the charge mode of the power supply station 100 is the second mode, the control unit 101 advances the process to step S805. If the charge mode of the power supply station 100 is the third mode, the control unit 101 advances the process to step S806.

In step S804, the control unit 101 selects, as a power supply target, a power receiving apparatus having the lowest remaining capacity rate from the camera 200 and mobile phone 300 registered in the group of the group number "1".

In FIG. 3A, the remaining capacity rate (85%) of the mobile phone 300 is lower than that (90%) of the camera 200. In this case, the control unit 101 selects the mobile phone 300 as a power supply target in step S804.

Note that when the remaining capacity rate of the mobile phone 300 becomes higher than that of the camera 200, the control unit 101 selects the camera 200 as a power supply target in step S804. When the control unit 101 selects the power receiving apparatus as the power supply target, it advances the process to step S807.

In step S805, the control unit 101 selects, as a power supply target, a power receiving apparatus having the shortest current operable time period from the camera 200 and mobile phone 300 registered in the group of the group number "1". In step S805, the control unit 101 compares the operable time periods of the camera 200 and mobile phone 300 to select a power supply target.

In FIG. 3A, the operable time period (20H) of the camera 200 is shorter than that (23H) of the mobile phone 300. In this case, the control unit 101 selects the camera 200 as a power supply target in step S805.

Note that when the operable time period of the mobile phone 300 becomes shorter than that of the camera 200, the control unit 101 selects the mobile phone 300 as a power supply target in step S805. When the control unit 101 selects the power receiving apparatus as the power supply target, it advances the process to step S807.

In step S806, the control unit 101 decides, as a power supply target, a power receiving apparatus having the longest time period required until the full charge state from the camera 200 and mobile phone 300 registered in the group of the group number "1". Note that the time period required until the full charge state corresponds to "time period required until full charge" in FIG. 3A. In FIG. 3A, the time period (20 min) required until the mobile phone 300 reaches the full charge state is longer than that (15 min) required until the camera 200 reaches the full charge state. In this case, the control unit 101 selects the mobile phone 300 as a power supply target in step S806.

Note that when the time period required until the camera 200 reaches the full charge state becomes longer than that required until the mobile phone 300 reaches the full charge state, the control unit 101 selects the camera 200 as a power supply target in step S806. When the control unit 101 selects the power receiving apparatus as the power supply target, it advances the process to step S807.

In step S807, the control unit 101 controls the control signal communication circuit 107 to transmit a charge command required to instruct the power receiving apparatus as the power supply target to change the self state to the power receiving state. For example, when the control unit 101 selects the mobile phone 300 in step S804, the control signal communication circuit 107 transmits a charge command including the destination identifier of the mobile phone 300.

When the control signal communication circuit 107 transmits the charge command, the control unit 101 advances the process to step S808.

In step S808, the control unit 101 controls the control signal communication circuit 107 to transmit a charge stop command required to instruct power receiving apparatuses other than that to which the charge command was transmitted of those registered in the device table to change the self state to the power receiving stop state.

For example, when the control unit 101 selects the mobile phone 300 in step S804, the control signal communication circuit 107 transmits the charge stop command including destination identifiers of all power receiving apparatuses other than the mobile phone 300 in step S808. In this case, the control signal communication circuit 107 transmits the charge stop command including the destination identifier of the camera 200. Note that the following explanation will continue while taking as an example the case in which the control unit 101 selects the mobile phone 300 in step S804.

When the control signal communication circuit 107 transmits the charge stop command, the control unit 101 advances the process to step S809.

In step S809, the control unit 101 transmits a power supply magnetic flux pattern generated on the primary coil 108 by the resonance circuit 106 to all the power receiving apparatuses placed on the power supply station 100. At this time, even when a plurality of power receiving apparatuses other than the camera 200 and mobile phone 300 are placed on the power supply station 100, other power receiving apparatuses including the camera 200 other than the mobile phone 300, which received the charge command, are set in the power receiving stop state by the charge stop command. For this reason, the power receiving apparatuses other than the mobile phone 300, which are set in the charge stop state, cannot charge their secondary batteries. Then, only the mobile phone 300, which received the charge command, is set in the power receiving state, and charges the secondary battery from the first magnetic flux pattern.

For this reason, the mobile phone 300 can charge the secondary battery connected to it, but the camera 200 does not charge the secondary battery connected to it. As a result, even when the power supply station 100 supplies electric power to the plurality of power receiving apparatuses including the camera 200 and mobile phone 300, the power receiving apparatuses other than the mobile phone 300 do not consume electric power supplied from the power supply station 100 to charge their secondary batteries. The mobile phone 300 consumes the electric power supplied from the power supply station 100 to charge its secondary battery. Therefore, electric power larger than that when all the power receiving apparatuses parallelly charge the secondary batteries by electric power supplied from the power supply station 100 is supplied to the mobile phone 300. When the power supply process to the power receiving apparatus in the charge state is started, the control unit 101 advances the process to step S810.

In step S810, the control unit 101 controls the wireless communication unit 109 to acquire charge information of the camera and that of the mobile phone 300, which are registered in the group of the group number "1" selected in step S801. When the control unit 101 acquires the charge information of the camera 200 and that of the mobile phone 300, it stores them in the storage unit 102. When the charge information of the camera 200 and that of the mobile phone 300 are stored in the storage unit 102, the control unit 101 advances the process to step S811.

In step S811, the control unit 101 checks based on the charge information acquired in step S810 whether or not charging of at least one of the camera 200 and mobile phone 300 is complete. In this case, the control unit 101 determines whether or not charging of at least one of the plurality of power receiving apparatuses registered in the group of the group number "1" selected in step S801 is complete by the process in step S811.

For example, when the power supply station 100 supplies electric power to the mobile phone 300, the control unit 101 checks in step S811 based on the charge information of the mobile phone 300 whether or not the remaining capacity rate of the secondary battery attached to the mobile phone 300 becomes 100%. In this case, when the remaining capacity rate of the secondary battery attached to the mobile phone 300 is 100%, the control unit 101 determines that charging of the secondary battery attached to the mobile phone 300 is complete. Note that when the remaining capacity rate of the secondary battery attached to the mobile phone 300 is not 100%, the control unit 101 determines that charging of the secondary battery attached to the mobile phone 300 is not complete yet.

On the other hand, for example, when the power supply station 100 supplies electric power to the camera 200, the control unit 101 checks in step S811 based on the charge information of the camera 200 whether or not the time period required until the secondary battery attached to the camera 200 reaches the full charge state becomes 0 min. In this case, when the time period required until the secondary battery attached to the camera 200 reaches the full charge state is 0 min, the control unit 101 determines that charging of the secondary battery attached to the camera 200 is complete. Note that when the time period required until the secondary battery attached to the camera 200 reaches the full charge state is not 0 min, the control unit 101 determines that charging of the secondary battery attached to the camera 200 is not complete yet.

When the control unit 101 determines that charging of the camera 200 and mobile phone 300 is not complete yet, it advances the process to step S812. In this case, since charging of the camera 200 and mobile phone 300 is not complete yet, the power supply station 100 continues to charge the camera 200 and mobile phone 300 registered in the group of the group number "1" selected in step S801.

When the control unit 101 determines in step S811 that charging of at least one of the camera 200 and mobile phone 300 is complete, it ends the power supply process. In this case, since charging of at least one power receiving apparatus of the camera 200 and mobile phone 300 registered in the group of the group number "1" selected in step S801 is complete, the power supply station 100 temporarily stops charging of the camera 200 and mobile phone 300. In this case, the control unit 101 deletes the identification information and charge information of the charge completed power receiving apparatus from the device table by executing the group identification process again, and updates information included in the group table. In this case, the power supply process to the power receiving apparatus included in the group selected in step S801 is restarted after the identification information and charge information of the charge completed power receiving apparatus are deleted from the device table.

Note that the control unit 101 determines in step S811 based on the charge information acquired in step S810 whether or not charging of at least one of the camera 200 and mobile phone 300 is complete. However, the determination process in step S811 as to whether or not charging is complete may be done by executing the same process as in step S508 as long as it can determine whether or not at least one secondary battery of the camera 200 and mobile phone 300 is fully charged.

In step S812, the control unit 101 checks whether or not the remaining capacity rate of the mobile phone 300 reaches a predetermined value. Note that the predetermined value in step S812 is an arbitrary value stored in the storage unit 102, and it may be set by the user. Alternatively, the control unit 101 may decide the predetermined value according to the charge information of the camera 200 and that of the mobile phone 300.

In the first embodiment, for example, a remaining capacity rate "80%" is used as the predetermined value. When the charge command is transmitted to the mobile phone 300, and the mobile phone 300 charges the secondary battery (not shown), the control unit 101 checks based on the charge information of the mobile phone 300 acquired in step S810 whether or not the remaining capacity rate of the mobile phone 300 reaches the predetermined value "80%".

When the remaining capacity rate of the mobile phone 300 is lower than the predetermined value "80%", the control unit 101 returns the process to step S809. In this case, the power receiving apparatus which receives electric power continuously charges its secondary battery. When the remaining capacity rate of the mobile phone 300 is equal to or higher than the predetermined value "80%", the control unit 101 advances the process to step S813.

In step S813, the control unit 101 checks whether or not the remaining capacity rates of all the power receiving apparatuses included in the group number "1" are "80%" or more. When the remaining capacity rate of the camera 200 is lower than the predetermined value "80%", the control unit 101 returns the process to step S803. In this case, the charge mode of the power supply station 100 is checked again in step S803. When the remaining capacity rates of the camera 200 and mobile phone 300 are equal to or higher than the predetermined value "80%", the control unit 101 advances the process to step S814. Note that the process in step S813 checks whether or not the remaining capacity rates of all the power receiving apparatuses included in the group selected as the power supply target are equal to or higher than the predetermined value.

In step S814, the control unit 101 changes the predetermined value stored in the storage unit 102 to be larger than that used in the processes in steps S812 and S813. In this case, when the predetermined value used in steps S812 and S813 is "80%", the control unit 101 changes the predetermined value "80%" to "85%". Note that the predetermined value may be changed to, for example, "82%" or "90%" in step S814 as long as it is larger than the predetermined value used in steps S812 and S813. Also, the predetermined value may be changed to a value set by the user in step S814 as long as it is larger than the predetermined value used in steps S812 and S813.

When the control unit 101 changes the predetermined value to a larger value, it advances the process to step S815.

In step S815, the control unit 101 controls the control signal communication circuit 107 to transmit the charge command to all the power receiving apparatuses included in the power supply target group. Note that the control unit 101 controls the control signal communication circuit 107 to transmit the charge stop command to power receiving apparatuses other than the power supply target group in this case. When the control signal communication circuit 107 transmits the charge command, the control unit 101 returns the process to step S809.

With the process in step S815, the control unit 101 can control to parallelly supply equal electric power to all the power receiving apparatuses included in the power supply target group.

As described above, when the power supply apparatus according to the first embodiment supplies in parallel electric power to a plurality of power receiving apparatuses, it selects one of the plurality of power receiving apparatuses so as to preferentially execute charging in turn from a power receiving apparatus having a smaller remaining capacity. Furthermore, the selected power receiving apparatus receives electric power until the remaining capacity of a battery connected to that power receiving apparatus reaches a predetermined value. In this way, variations of the remaining capacity rates of the secondary batteries of the power receiving apparatuses can be suppressed in the plurality of power receiving apparatuses which simultaneously receive electric power. Therefore, even when the power supply apparatus supplies in parallel electric power to the plurality of power receiving apparatuses, it can supply electric power so that the respective power receiving apparatuses have even remaining capacities.

When the power supply apparatus supplies in parallel electric power to a plurality of power receiving apparatuses, it selects one of the plurality of power receiving apparatuses so as to preferentially execute charging in turn from a power receiving apparatus having a shorter operable time period. Furthermore, the selected power receiving apparatus receives electric power until the remaining capacity of a battery connected to that power receiving apparatus reaches a predetermined value. In this way, variations of the remaining capacity rates of the secondary batteries or operable time periods of the power receiving apparatuses can be suppressed in the plurality of power receiving apparatuses which simultaneously receive electric power. Therefore, even when the power supply apparatus supplies in parallel electric power to the plurality of power receiving apparatuses, it can supply electric power so that the respective power receiving apparatuses have even remaining capacities.

When the power supply apparatus supplies in parallel electric power to a plurality of power receiving apparatuses, it selects one of the plurality of power receiving apparatuses so as to preferentially execute charging in turn from a power receiving apparatus having a longer time period required until a full charge state. Furthermore, the selected power receiving apparatus receives electric power until the remaining capacity of a battery connected to that power receiving apparatus reaches a predetermined value. In this way, variations of the remaining capacity rates of the secondary batteries of the power receiving apparatuses or the time periods until the secondary batteries of the respective power supply apparatuses reach the full charge state can be suppressed in the plurality of power receiving apparatuses which simultaneously receive electric power. Therefore, even when the power supply apparatus supplies in parallel electric power to the plurality of power receiving apparatuses, it can supply electric power so that the respective power receiving apparatuses have even remaining capacities.

Furthermore, the power supply apparatus divides a plurality of power receiving apparatuses which exist within a power supply range into different groups in chronological order. Hence, the power supply apparatus can manage a plurality of power receiving apparatuses for each group. Then, when the power supply apparatus supplies in parallel electric power to the plurality of power receiving apparatuses corresponding to the selected group, even when it confirms that a new power receiving apparatus exists within the power supply range, the power supply apparatus can continue to supply electric power to the plurality of power receiving apparatuses without changing the power supply target.

Moreover, when the remaining capacities of all of the plurality of power receiving apparatuses in the group selected as the power supply target are equal to or higher than a predetermined value, it supplies in parallel equal electric power to all the power receiving apparatuses in the group. In this way, variations of the remaining capacities of the power receiving apparatuses can be suppressed.

Note that the control unit 101 checks in step S812 whether or not the remaining capacity rate of the power receiving apparatus is equal to or higher than the predetermined value. Alternatively, the process in step S812 may be attained by comparing the time period required until the power receiving apparatus reaches the full charge state and a predetermined time period in place of comparison between the remaining capacity rate of the power receiving apparatus and the predetermined value. In this case, the control unit 101 checks in step S813 whether or not the time periods required until all the power receiving apparatuses included in the power supply target group reach the full charge state are equal to or shorter than the predetermined time period. Furthermore, in this case, in step S815, the control unit 101 changes the predetermined time period stored in the storage unit 102 to be shorter than the predetermined time period used in the processes in steps S812 and S813. Also, the remaining capacity of each power receiving apparatus is presented as the remaining capacity rate, but the present invention is not limited to this.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-079442, filed Mar. 30, 2010, which is hereby incorporated by reference herein in its entirety.

What is claimed is:

1. A power supply apparatus comprising:
   a power supply unit that supplies power to one or more power receiving apparatuses wirelessly;
   a detection unit that detects one or more power receiving apparatuses;
   a division unit that divides, if the detection unit detects a second power receiving apparatus before elapsing a predetermined time since the detection unit detects a first power receiving apparatus, the first power receiving apparatus and the second power receiving apparatus into a first group; and
   a communication unit that (a) transmits a first command, used for causing the first power receiving apparatus to receive power from the power supply apparatus, to the first power receiving apparatus if a remaining capacity of a first battery connected to the first power receiving apparatus is smaller than a remaining capacity of a second battery connected to the second power receiving apparatus after the first group is selected, and (b) transmits a second command, used for causing the second power receiving apparatus not to receive power from the power supply apparatus, to the second power receiving apparatus if the remaining capacity of the first battery is smaller than the remaining capacity of the second battery,
   after the first group is selected.

2. The power supply apparatus according to claim 1, wherein:
   the communication unit transmits a third command, used for causing the second power receiving apparatus to receive power from the power supply apparatus, to the second power receiving apparatus after the remaining capacity of the first battery reaches a predetermined remaining capacity if the remaining capacity of the first battery is smaller than the remaining capacity of the second battery.

3. The power supply apparatus according to claim 1, wherein the division unit releases the first power receiving apparatus from the first group if the first battery is in a full charge state, and wherein
   the communication unit does not transmit the first command to the first power receiving apparatus released from the first group.

4. The power supply apparatus according to claim 1, wherein if the detection unit detects a third power receiving apparatus after elapsing the predetermined time since the detection unit detects the first power receiving apparatus, the division unit divides the third power receiving apparatus into a second group that is different from the first group, and
   wherein, if the first group is selected, the communication unit does not transmit a fourth command, used for causing the third power receiving apparatus to receive power from the power supply apparatus, to the third power receiving apparatus until the second group is selected.

5. A method for controlling a power supply apparatus, the method comprising:
   supplying power to one or more power receiving apparatuses wirelessly;
   detecting one or more power receiving apparatuses;
   dividing, if a second power receiving apparatus is detected before elapsing a predetermined time since a first power receiving apparatus is detected, the first power receiving apparatus and the second power receiving apparatus into a first group;
   transmitting a first command, used for causing the first power receiving apparatus to receive power from the power supply apparatus, to the first power receiving apparatus if a remaining capacity of a first battery connected to the first power receiving apparatus is smaller than a remaining capacity of a second battery connected to the second power receiving apparatus after the first group is selected; and
   transmitting, a second command, used for causing the second power receiving apparatus not to receive power from the power supply apparatus, to the second power receiving apparatus if a remaining capacity of the first battery is smaller than a remaining capacity of the second battery after the first group is selected.

6. The method according to claim 5, further comprising:
transmitting a third command, used for causing the second power receiving apparatus to receive power from the power supply apparatus, to the second power receiving apparatus until the remaining capacity of the first battery reaches the predetermined remaining capacity after the remaining capacity of the first battery reaches a predetermined remaining capacity if the remaining capacity of the first battery is smaller than the remaining capacity of the second battery.

7. The method according to claim 5, further comprising:
releasing the first power receiving apparatus from the first group if the first battery is in a full charge state, and
not transmitting the first command to the first power receiving apparatus released from the first group.

8. The method according to claim 5, further comprising:
dividing, if a third power receiving apparatus is detected after elapsing the predetermined time since the first power receiving apparatus is detected, the third power receiving apparatus into a second group that is different from the first group and
not transmitting a fourth command, used for causing the third power receiving apparatus to receive power from the power supply apparatus, to the third power receiving apparatus until the second group is selected, if the first group is selected.

9. A computer-readable storage medium storing a computer-executable program that causes a computer to execute a method for controlling a power supply apparatus, the method comprising:
supplying power to one or more power receiving apparatuses wirelessly;
detecting one or more power receiving apparatuses;
dividing, if a second power receiving apparatus is detected before elapsing a predetermined time since a first power receiving apparatus is detected, the first power receiving apparatus and the second power receiving apparatus into a first group;
transmitting a first command, used for causing the first power receiving apparatus to receive power from the power supply apparatus, to the first power receiving apparatus if a remaining capacity of a first battery connected to the first power receiving apparatus is smaller than a remaining capacity of a second battery connected to the second power receiving apparatus after the first group is selected; and
transmitting, a second command, used for causing the second power receiving apparatus not to receive power from the power supply apparatus, to the second power receiving apparatus if a remaining capacity of the first battery is smaller than a remaining capacity of the second battery after the first group is selected.

* * * * *